United States Patent
Jeong et al.

(10) Patent No.: US 10,129,842 B2
(45) Date of Patent: Nov. 13, 2018

(54) METHOD AND DEVICE FOR TRANSMITTING SYNCHRONIZATION SIGNAL FOR DEVICE-TO-DEVICE COMMUNICATION

(71) Applicant: Samsung Electronics Co., Ltd, Gyeonggi-do (KR)

(72) Inventors: Cheol Jeong, Gyeonggi-do (KR); Hyun-Seok Ryu, Gyeonggi-do (KR); Seung-Hoon Park, Seoul (KR); Peng Xue, Gyeonggi-do (KR); Hyun-Kyu Yu, Gyeonggi-do (KR); Sang-Won Choi, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 48 days.

(21) Appl. No.: 15/310,091

(22) PCT Filed: May 11, 2015

(86) PCT No.: PCT/KR2015/004674
§ 371 (c)(1),
(2) Date: Nov. 9, 2016

(87) PCT Pub. No.: WO2015/170940
PCT Pub. Date: Nov. 12, 2015

(65) Prior Publication Data
US 2017/0245227 A1    Aug. 24, 2017

(30) Foreign Application Priority Data
May 9, 2014   (KR) .................. 10-2014-0055737

(51) Int. Cl.
H04W 72/00   (2009.01)
H04W 56/00   (2009.01)
(Continued)

(52) U.S. Cl.
CPC ....... *H04W 56/001* (2013.01); *H04W 52/242* (2013.01); *H04W 72/0413* (2013.01)

(58) Field of Classification Search
CPC .......... H04W 56/001; H04W 72/0413; H04W 52/242
See application file for complete search history.

(56) References Cited

U.S. PATENT DOCUMENTS 9,615,341 B2 *   4/2017   Sartori .................... H04J 11/00
9,730,174 B2 *   8/2017   Seo ..................... H04W 56/002
(Continued)

FOREIGN PATENT DOCUMENTS

| KR | 10-2013-0029355 | 3/2013 |
| WO | WO 2013/081393 A1 | 6/2013 |
| WO | WO 2014/003342 A1 | 1/2014 |

OTHER PUBLICATIONS

International Search Report dated Aug. 13, 2015 in connection with International Application No. PCT/KR2015/004674, 5 pages.
(Continued)

*Primary Examiner* — Phuc Tran (57) ABSTRACT

The present invention relates to a communication technique for converging IoT technology with a 5G communication system for supporting a higher data transmission rate than that of a 4G system and subsequent systems, and a system thereof. The present invention can be applied to intelligent services on the basis of 5G communication technology and IoT-related technology (for example, smart home, smart building, smart city, smart car or connected car, health care, digital education, retail, security, and safety related services and the like). The present invention provides a method and a device for transmitting a synchronization signal for device-to-device (D2D) communication. According to the present invention, a first terminal receives a D2D synchronization signal (D2DSS) and a physical D2D synchronization chan- (Continued)

nel (PD2DSCH) corresponding to the D2DSS from a second terminal, and transmits the D2DSS to the second terminal according to a method preassigned with the second terminal so as to indicate that the first terminal has successfully received the D2DSS or the PD2DSCH.

16 Claims, 5 Drawing Sheets

(51) Int. Cl.
*H04W 52/24* (2009.01)
*H04W 72/04* (2009.01)

(56) References Cited

U.S. PATENT DOCUMENTS

| | | | | |
|---|---|---|---|---|
| 9,807,711 | B2* | 10/2017 | Zhao | H04W 52/322 |
| 9,893,855 | B2* | 2/2018 | Kim | H04L 5/0048 |
| 2013/0077512 | A1 | 3/2013 | Chang et al. | |
| 2014/0105342 | A1 | 4/2014 | Ray et al. | |
| 2014/0321452 | A1* | 10/2014 | Choi | H04W 8/005 370/350 |
| 2015/0341878 | A1 | 11/2015 | Lee et al. | |
| 2017/0099174 | A1* | 4/2017 | Kim | H04L 27/2613 |
| 2017/0325243 | A1* | 11/2017 | Yasukawa | H04W 72/085 |

OTHER PUBLICATIONS

Written Opinion of the International Searching Authority dated Aug. 13, 2015 in connection with International Application No. PCT/KR2015/004674, 5 pages.

Samsung, "D2D Synchronization Signal Relay by UE", 3GPP TSG RAN WG1 Meeting #76bis, R1-141314, Shenzhen, China, Mar. 31-Apr. 4, 2014, 3 pages.

LG Electronics, "Discussion on Design of D2DSS and PD2DSCH", 3GPP TSG RAN WG1 Meeting #76bis, R1-141357, Shenzhen, China, Mar. 31-Apr. 4, 2014, 4 pages.

* cited by examiner

METHOD AND DEVICE FOR TRANSMITTING SYNCHRONIZATION SIGNAL FOR DEVICE-TO-DEVICE COMMUNICATION

CROSS-REFERENCE TO RELATED APPLICATION(S)

The present application claims priority under 35 U.S.C. § 365 to International Patent Application No. PCT/KR2015/004674 filed May 11, 2015, entitled "METHOD AND DEVICE FOR TRANSMITTING SYNCHRONIZATION SIGNAL FOR DEVICE-TO-DEVICE COMMUNICATION", and, through International Patent Application No. PCT/KR2015/004674, to Korean Patent Application No. 10-2014-0055737 filed May 9, 2014, each of which are incorporated herein by reference into the present disclosure as if fully set forth herein.

FIELD OF THE DISCLOSURE

The present invention relates to a method and apparatus for transmitting a synchronization signal for device-to-device communication.

DESCRIPTION OF THE RELATED ART

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data rate, an implementation of the 5G communication system in a mmWave band (for example, 60 GHz band) is being considered. In the 5G communication system, technologies such as beamforming, massive Multi-Input Multi-Output (MIMO), Full Dimensional MIMO (FD-MIMO), array antenna, analog beamforming, and large scale antenna are discussed to mitigate a propagation path loss in the mmWave band and increase propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and a method for receiving interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to the Internet of Things (IoT) network that exchanges and processes information between distributed components such as objects and the like in a human-oriented connection network in which humans generate and consume information. An Internet of Everything (IoE) technology may be an example of a combination of an IoT technology and a big data processing technology through a connection with a cloud server.

In order to implement the IoT, research is being conducted on technical factors such as a sensing technique, wired/wireless communication and network infrastructure, service interface technology, and security technology, and thus technologies such as a sensor network, Machine to Machine (M2M), Machine Type Communication (MTC), and the like are required for a connection between objects.

In an IoT environment, through collection and analysis of data generated in connected objects, an intelligent Internet Technology (IT) service to create a new value for people's lives may be provided. The IoT may be applied to fields, such as a smart home, smart building, smart city, smart car, connected car, smart grid, health care, smart home appliance, or high-tech medical service, through the convergence and combination of the conventional Information Technology (IT) and various industries.

Accordingly, various attempts to apply the 5G communication to the IoT network are made. For example, 5G communication technologies such as a sensor network, Internet of Things, MTC, etc. are implemented by techniques such as beamforming, MIMO, and array antenna. The application of a cloud RAN as the big data processing technology previously described may be an example of convergence of the 5G technology and the IoT technology.

Recently, due to the supply of smart phones, data traffic has been rapidly increased. A report of the Korea Communications Commission (KCC) shows that mobile data traffic has increased three times over the past year due to the accelerating supply of smart phones. The number of users of smart phones will further increase and application services through the smart phones will become further activated. Accordingly, mobile data traffic is expected to increase much more than now. Particularly, when Machine to Machine (M2M) communication such as communication between a person and a machine and communication between machines that corresponds to a new mobile market beyond communication between people is activated, traffic transmitted to an evolved NodeB (eNB) is expected to increase beyond that which can be handled.

Therefore, a technology capable of solving these problems is required. Recently, Device to Device direct communication technology has attracted attention. This technology, called 'Device to Device (D2D) communication', has been attracting attention in both licensed bands used by cellular mobile communication and unlicensed bands used by WLAN communication.

When the D2D communication is converged with the cellular mobile communication, it is worthy of notice in that traffic capacity of the eNB increases and overload of the eNB decreases. In other words, when terminals (or User Equipments (UEs)) in the same cell or cells adjacent to each other directly exchange data over a D2D link without passing through a base station (for example, an evolved NodeB (eNB)) after setting up the D2D link between the UEs, two links (that is, a link from a UE to an eNB and a link from the eNB to another UE) may be reduced to one link (that is, a link between the UE and the other UE) so as to contribute to the resource efficiency.

Research on the unlicensed bands aims to prevent the unnecessary waste of wireless resources by recognizing the requests for communication between people, communication between people and machines, and communication between machines, and to appropriately provide a service by determining the traffic that occurs locally. Therefore, the research is focused on a method of efficiently operating a process of broadcasting information on a service or a content to the surroundings and receiving the service and content by a plurality of devices.

In order to perform D2D communication, a process of setting up synchronization between devices is required. A device may set up synchronization between devices using time information received through a synchronous eNB or a Global Positioning System (GPS) receiver module. According to a method for setting up, by a device, synchronization between devices using time information received through a synchronous eNB or a GPS receiver module, the device is required to access the synchronous eNB or the GPS receiver module.

However, according to a communication scheme provided by a communication service provider, the device may not support the synchronous eNB, so that it may not set up synchronization using the time information received through the synchronous eNB. In addition, when the device is located in a GPS shadow area (for example, an area between skyscrapers, a tunnel area, an interior of a building, and the like), the device may not set up its synchronization since it cannot receive time information from the GPS. As such, the device may not even initiate the D2D communication when its access to the synchronous eNB or GPS receiver module is not smooth.

Therefore, the purpose of the present invention is to provide a method and apparatus for transmitting a synchronization signal required for D2D communication.

In addition, the purpose of the present invention is to provide a method and apparatus for controlling transmission power for a synchronization signal required for D2D communication

SUMMARY

In accordance with an aspect of the present invention, a method for transmitting a synchronization signal for Device-to-Device (D2D) communication is provided. The method includes: receiving, by a first UE, a D2D synchronization signal (D2DSS) and a physical D2D synchronization channel (PD2DSCH) corresponding to the D2DSS from a second UE, and transmitting the D2DSS to the second UE according to a method pre-arranged with the second UE so as to indicate that the first UE has successfully received the D2DSS or the PD2DSCH.

In addition, in accordance with an embodiment of the present invention, a method for transmitting a synchronization signal for device-to-device (D2D) communication is provided. The method includes: transmitting, by a first UE, a D2D synchronization signal (D2DSS) and a physical D2D synchronization channel (PD2DSCH) corresponding to the D2DSS, to a second terminal; and determining, by the first UE, whether the D2DSS and the PD2DSCH have been successfully transmitted depending on whether the D2DSS is received from the second UE, and transmitting a result of determination to a base station.

In addition, in accordance with an embodiment of the present invention, an apparatus for transmitting a synchronization signal for device-to-device (D2D) communication is provided. The apparatus includes: a transceiver unit configured to receive, from another UE, a D2D synchronization signal (D2DSS) and a physical D2D synchronization channel (PD2DSCH) corresponding to the D2DSS, and transmit the D2DSS to the other UE according to a method pre-arranged with the other UE so as to indicate that the D2DSS or the PD2DSCH has been successfully received; and a controller configured to control an operation of the transceiver unit.

In addition, in accordance with an embodiment of the present invention, an apparatus for transmitting a synchronization signal for device-to-device (D2D) communication is provided. The apparatus includes: a transceiver unit configured to transmit, to another terminal, a D2D synchronization signal (D2DSS) and a physical D2D synchronization channel (PD2DSCH) corresponding to the D2DSS, receive the D2DSS from the other terminal, and transmit, to a base station, whether the D2DSS and the PD2DSCH have been successfully transmitted; and a controller configured to determine whether the D2DSS and the PD2DSCH have been successfully transmitted depending on whether the D2DSS is received from the other terminal and control an operation of the transceiver unit.

DETAILED DESCRIPTION

Hereinafter, various embodiments will be described with reference to the accompanying drawings. It should be noted that the same elements will be designated by the same reference numerals although they are shown in different drawings. Further, detailed descriptions of known functions and configurations which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

In the detailed description of the present invention, an example of interpretable meanings of some terms used in the present specification is proposed. However, it is noted that the terms are not limited to the examples of the construable meanings which are proposed below.

The base station is a subject communicating with a terminal, and may be referred to as a BS, a Base Transceiver Station (BTS), a NodeB (NB), eNodB (eNB), an Access Point (AP) or the like.

The user equipment is a subject communicating with the BS, and may be referred to as a UE, a device, a Mobile Station (MS), a Mobile Equipment (ME), a terminal and the like.

A UE performing D2D communication may be divided into a synchronization transmission UE and a synchronization reception UE according to the role thereof. The synchronization transmission UE (also referred to as synchronization source) is a terminal which may transmit a D2D Synchronization Signal (D2DSS), a Physical D2D Synchronous Channel (PD2DSCH), a Physical D2D Broadcast Channel (PD2DBCH), or D2D System Information Channel (D2D SICH) and includes a synchronization reference UE and a synchronization relaying UE. In some cases, the "base station" for transmitting a D2D synchronization signal may be treated as the "synchronization reference UE". A synchronization reception UE (which may be referred to as D2DUE) is a terminal for receiving a synchronization signal or a synchronization channel.

The synchronization signal means a signal that includes a synchronization sequence which can be used to identify a cluster or a synchronization transmission UE, and a synchronization signal resource means a resource used to transmit the synchronization signal. The synchronization channel means a channel including a synchronization-related message, or a system-related message, and a synchronization channel resource means a resource for transmitting the synchronization channel. The synchronization transmission UE may transmit a synchronization signal or a synchronization channel. Hereinafter, for convenience, except for a case of being strictly separated from each other, it should be noted that a synchronization signal can be described as a concept including both the synchronization signal and the synchronization channel.

As previously described, in order to perform the D2D communication, synchronization between terminals has to be performed, and to this end, some or all terminals participating in the D2D communication have to transmit the D2DSS signal. In addition, for the D2D communication, information should be exchanged between terminals, and a part of the information may be transmitted through the D2DSS. Information that is not included in D2DSS may be transmitted through the D2DSCH or D2DBCH.

Information transmitted through the D2DSS or D2DSCH/D2DBCH is as follows:

- The identifier (Identity; ID) of a synchronization transmission UE for transmitting a synchronization signal
- The type of a synchronization transmission UE for transmitting a synchronization signal: a base station or an in-coverage UE which is connected to the base station or can communicate with the base station or an out-of-coverage UE which is not connected to the base station and cannot communicate with the base station, etc.
- The number of hops of a synchronization signal and a maximum number of hops of the synchronization signal
- The accuracy of a synchronization signal
- The effective time of a synchronization signal, a time scheduled for resetting the synchronization signal, and duration of the synchronization signal
- Resource information for D2D communication
- A system bandwidth for D2D communication
- PD2DBCH period and offset
- Time Division Duplexing (TDD) and Frequency Division Duplexing (FDD) related configuration information
- A maximum transmission power of a UE and power control information of the UE
- Information notification of expected changes in synchronization
- A reception quality threshold value of a synchronization signal On the other hand, a UE may match synchronization with a UE which has transmitted a D2DSS by detecting a time point at which the D2DSS is received. The D2DSS can be designed by using several sequences such as a Zadoff-Chu sequence or m sequence. In addition, the D2DSS also may be configured as one type, and may be configured as two types of a Primary D2DSS (PD2DSS) and a Secondary D2DSS (SD2DSS). For example, the PD2DSS can be designed similarly to a Primary Synchronization Signal (PSS) of the 3GPP LTE system, and the SD2DSS can be designed similarly to the Secondary Synchronization Signal (SSS). The PD2DSCH is configured on a channel coding basis not a sequence basis unlike the D2DSS, and may have a structure similar to a Physical Uplink Shared Channel (PUSCH) of a 3GPP LTE system. Therefore, in general, the D2DSS may be transmitted further than the PD2DSCH.

Figure 1:
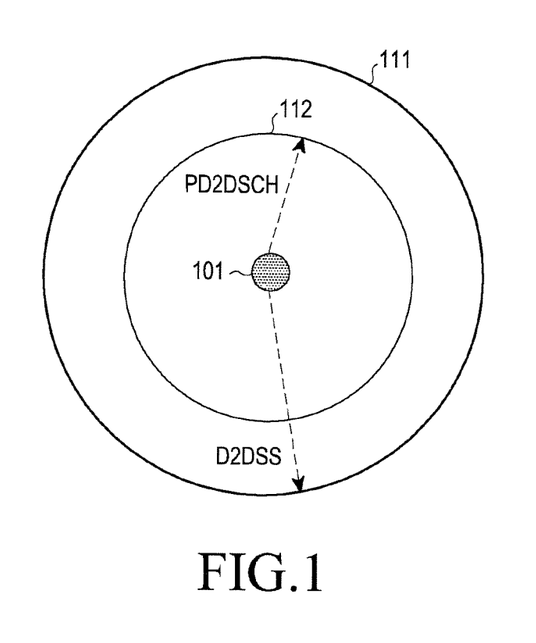
FIG. 1 is a diagram showing the coverage of a D2DSS and a PD2DSCH.

FIG. 1 is a diagram showing the coverage of a D2DSS and a PD2DSCH.

In FIG. 1, reference numeral 111 represents the coverage of the D2DSS, and reference numeral 112 represents the coverage of a PD2DSCH. Reference numeral 101 (UE or eNB, hereinafter referred to as synchronization transmission UE) may transmit one or both of the D2DSS and PD2DSCH. When the synchronization transmission UE 101 has transmitted both the D2DSS and the PD2DSCH, as shown in FIG. 1, since the coverage of PD2DSCH is narrower than the coverage of D2DSS, a synchronization reception UE may successfully receive the D2DSS and fail to receive the PD2DSCH. Although it is possible to design such that the PD2DSCH can be transmitted as far as the D2DSS in order to prevent the above problem, there is a disadvantage in that the overhead of a system increases because a large amount of resources for the PD2DSCH transmission should be used. The synchronization reception UE may combine signals for the D2DSS and PD2DSCH received for several time slots in different methods and process the same. Therefore, an embodiment of the present invention proposes a method for more efficiently transmitting a D2D synchronization signal.

On the other hand, in the present specification, for convenience of explanation, it is assumed that In-Coverage terminals on the boundary of In-Coverage and Out-of-Coverage transmit, for Out-of-Coverage terminals, the D2DSS or PD2DSCH, and the UE of the In-Coverage is in a Radio Resource Control (RRC) idle state or a RRC connected state. However, the present invention is not limited thereto.

In addition, in the following description, the fact that a UE has successfully received the D2DSS indicates one or all of the following states:

- The sequence of the D2DSS was correctly detected by the UE.
- A signal quality of the D2DSS received by the UE is equal to or greater than a threshold value (X1).

In addition, in the following description, the fact that a UE has successfully received the PD2DSCH indicates one or all of the following states:

- Information included in the PD2DSCH is correctly acquired by the UE.
- A signal quality of the PD2DSCH received by the UE is equal to or greater than a threshold value (X2).

A synchronization signal transmission method according to an embodiment of the present invention may include the following six steps. In addition, all of the following steps are not necessarily successively performed in order to set up synchronization, and the order of the steps may be changed or some steps may be omitted depending on circumstances.

Step 1: After receiving the D2DSS by a reception UE, making a report, to a transmission UE, on whether the D2DSS has been successfully received Step 2: After receiving the D2DSS by the reception UE, making a report, to a transmission UE, on whether the PD2DSCH corresponding to the D2DSS has been successfully received Step 3: Making a report to a base station on whether the transmission UE has successfully transmitted the D2DSS and PD2DSCH Step 4: Controlling the transmission power of the D2DSS and PD2DSCH depending on whether the transmission UE has successfully transmitted the D2DSS and PD2DSCH Step 5: Setting the transmission power of the D2DSS by the reception UE according to transmission power information included in the PD2DSCH Step 6: Stopping the transmission of the D2DSS or PD2DSCH by the transmission UE Hereinafter, a detailed method for the above steps 1 to 6 will be described.

Step 1: After Receiving a D2DSS by a Reception UE, Making a Report, to a Transmission UE, on Whether the D2DSS has been Successfully Received FIG. 2 is a diagram for explaining a method by which a reception UE notifies the transmission UE of whether a reception UE has been successfully received a D2DSS according to an embodiment of the present invention.

Figure 2:
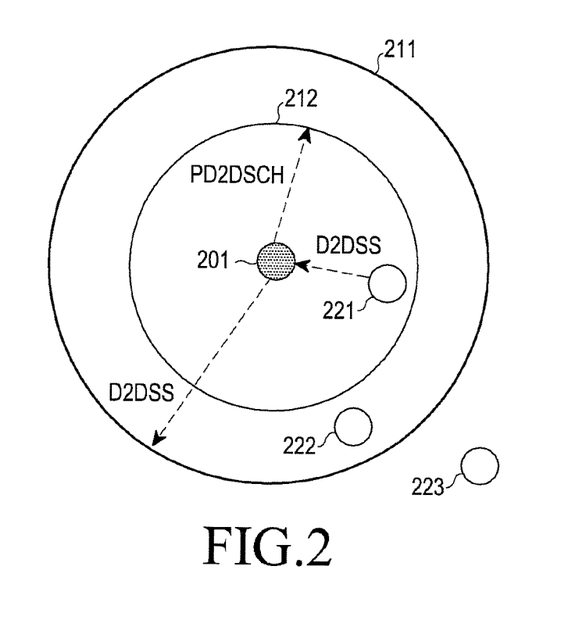
FIG. 2 is a diagram for explaining a method by which a reception UE notifies a transmission UE of whether a D2DSS has been successfully received according to an embodiment of the present invention.

Referring to FIG. 2, a UE1 201, located in the coverage, transmits the D2DSS and PD2DSCH. Reference numeral 211 represents the coverage of the transmitted D2DSS, and reference numeral 212 represents the coverage of the transmitted PD2DSCH. A UE2 221 is located in an area in which the D2DSS and PD2DSCH transmitted by the UE1 201 can be received, and notifies the UE1 201 that the D2DSS transmitted by the UE1 201 has been received, by transmitting the D2DSS after receiving the D2DSS transmitted by the UE1 201. In order for the UE2 221 to notify whether the D2DSS transmitted by the UE1 201 has been successfully received, resources that can be used at the time of transmitting the D2DSS can be predefined.

Figure 3:
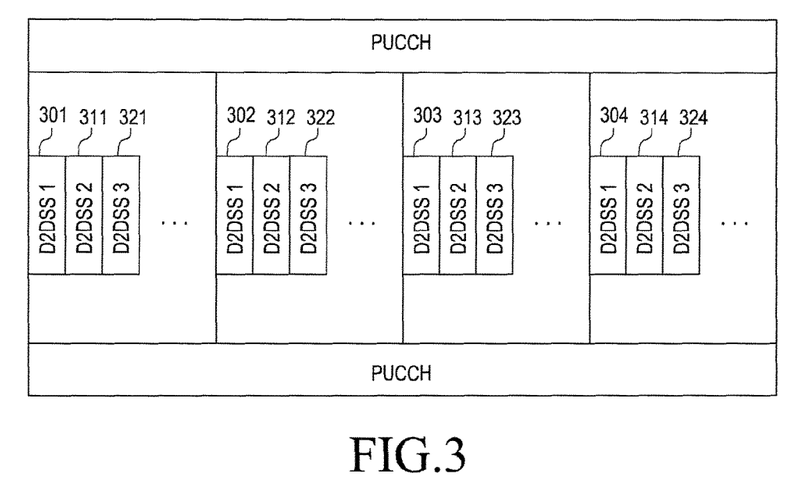
FIGS. 3 and 4 are diagrams for explaining a resource that can be used, by a reception UE, at the time of transmitting the D2DSS in order to notify of whether the D2DSS has been successfully received.
Figure 4:
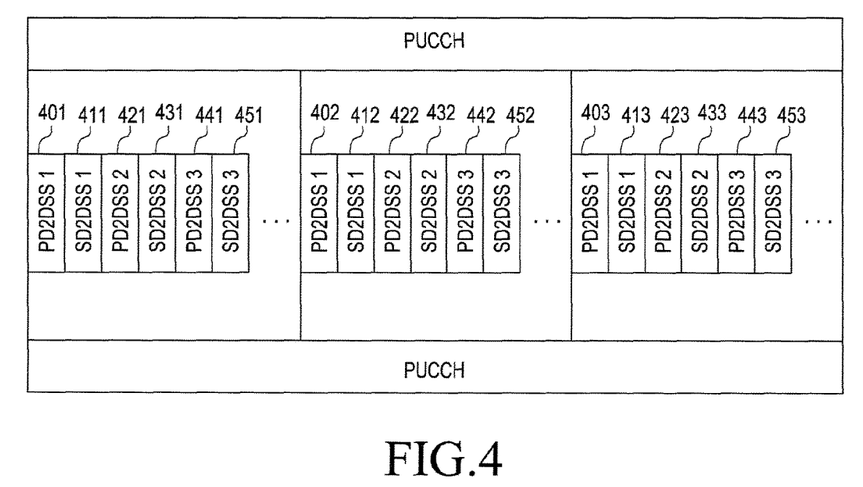

FIGS. 3 and 4 are diagrams for explaining resources that can be used, by a reception UE, at the time of transmitting the D2DSS in order to notify of whether the D2DSS has been successfully received.

Referring to FIG. 3, when the UE1 201 periodically transmits the D2DSS by using resources 301, 302, 303, and 304, resources which are used by the UE2 221 in order to notify of whether the D2DSS transmitted by the UE1 201 has been successfully received can be defined by reference numerals 311, 312, 313, and 314. In addition, resources 321, 322, 323, and 324 may be defined as resources used by other reception UEs in order to notify of whether the D2DSS transmitted by the UE1 201 has been successfully received. For example, in FIG. 3, resources 321, 322, 323, and 324 may be defined as resources for the D2DSS transmission by a UE3 222.

In addition, the sequence of a D2DSS transmitted by the UE2 221 may be related to the sequence of the D2DSS transmitted by the UE1 201. For example, the sequence of the D2DSS may be divided into a plurality of sets, and when the UE1 201 selects one sequence within one set among a plurality of sets and transmits the D2DSS, the UE2 221 may select other sequences within a set to which the sequence selected by the UE1 201 belongs and transmit the D2DSS. Accordingly, the UE1 201 may check whether the sequence transmitted by the UE2 221 is the sequence within the same set as the sequence transmitted by the UE1 201 so as to determine whether it is a response for the D2DSS transmitted by the UE1 201. In this case, the UE1 201 and UE2 221 may transmit the D2DSS at predetermined time intervals during a predetermined time using a specified resource.

On the other hand, since the UE3 222 is also located in the D2DSS coverage of the UE1 201, it may receive the D2DSS transmitted by the UE1 201, and accordingly the UE3 222 may transmit the D2DSS according to the same procedure as the UE2 221 in order to notify that the UE3 itself has successfully received the D2DSS.

A UE4 223 is located outside the D2DSS coverage of the UE1 201, and accordingly it may not receive the D2DSS transmitted by the UE1 201. Thus, the UE4 223 does not transmit the D2DSS.

For a predetermined time T1 after transmitting the D2DSS, the UE1 201 monitors whether the D2DSS is received by other UEs in response to the D2DSS transmitted by the UE1 itself. When the D2DSS is not received during a time T1, the UE1 201 may stop the transmission of D2DSS. At this time, the UE1 201 may be in an additional standby state for a predetermined time T2 and stop the D2DSS transmission. In addition, the UE1 201 may also stop the transmission of PD2DSCH.

In addition, in FIG. 3, when the UE2 221 transmits the D2DSS in response to the D2DSS transmitted by the UE1 201, the UE3 222 may receive the D2DSS transmitted by the UE2 221 if the UE3 222 is located in-coverage of the D2DSS of the UE2 221. The UE3 222 which has received the D2DSS transmitted by the UE2 221 may recognize that the D2DSS transmitted by the UE2 221 is a response to the D2DSS transmitted by the UE1 201, and may not transmit the D2DSS in response to the D2DSS transmitted by the UE1 201.

In addition, although FIG. 2 illustrates a case where the UE1 201 transmits both the D2DSS and PD2DSCH, the D2DSS may be transmitted by the UE1 201 and the PD2DSCH corresponding thereto may be transmitted by another UE.

Step 2: After Receiving the D2DSS by the Reception UE, Making a Report, to a Transmission UE, on Whether the PD2DSCH Corresponding to the D2DSS has been Successfully Received In FIG. 2, the UE2 221 and UE3 222, which have successfully received the D2DSS transmitted by the UE1 201, perform a monitoring operation in order to receive the PD2DSCH corresponding to the D2DSS transmitted by the UE1 201. The UE2 221 may successfully receive the PD2DSCH because it is located within the PD2DSCH coverage 212 of the UE1 201, and the UE3 222 may not successfully receive the PD2DSCH because it is located outside the PD2DSCH coverage 212 of the UE1 201. In addition, since the UE4 223 is located outside the D2DSS coverage 211 of the UE1 201, it may not receive the D2DSS and accordingly not monitor the PD2DSCH.

UEs which have received the D2DSS are required to report, to UEs which have transmitted the D2DSS and PD2DSCH, on whether the PD2DSCH corresponding to the D2DSS received by the UEs themselves has been successfully received. Since information required by out-of-coverage UEs may be included in the PD2DSCH, it is important that the UE, which has transmitted the PD2DSCH, checks whether the PD2DSCH has been successfully transmitted to the UEs.

In an embodiment of the present invention, a method by which a UE, which has received the PD2DSCH, notifies a UE, which has transmitted the PD2DSCH, of whether the PD2DSCH has been successfully received includes a method for using a signal transmitted by the UE, which has received the PD2DSCH, a method for using a sequence of the D2DSCH, and a method for using resources by which the D2DSS is transmitted. These methods, sequences, and resources may be agreed upon between a UE and a base station in advance.

First, according to the method for using a signal transmitted by the UE, which has received the PD2DSCH, only the D2DSS is transmitted when only the D2DSS is received by the UE, there is no signal to be transmitted when only the PD2DSCH is received, and both the D2DSS and PD2DSCH are transmitted when both the D2DSS and the PD2DSCH are received. The UE, which has transmitted the D2DSS and PD2DSCH, may determine that the corresponding UE has failed to receive the PD2DSCH when the D2DSS only is received from another UE, and determine that the corresponding UE has successfully received the PD2DSCH when both the D2DSS and the PD2DSCH are received from the other UE.

Next, a description will be given for a method of using a sequence of D2DSS.

The sequence of D2DSS transmitted by the UE1 201 in FIG. 2 includes two types of sequences. One type of sequence includes information indicating that the reception UE may not receive the PD2DSCH, and the other type of sequence includes information indicating that the reception UE has received the PD2DSCH. For example, when there are a total of 10 sequences from 1 to 10, five sequence sets, which are grouped by two sequences, may be configured as follows.

A sequence set: (1, 2), (3, 4), (5, 6), (7, 8), and (9, 10)

A small number among two sequences in the sequence set may indicate a reception failure for the PD2DSCH, and a large number may indicate a successful reception of the PD2DSCH.

The UE1 201 may transmit the D2DSS using a sequence belonging to one of the five sets. After receiving the D2DSS and PD2DSCH, the UE2 221 may transmit the D2DSS using a sequence within the same sequence set as the sequence set used by the UE1 201 for the transmission of D2DSS. For example, when the UE1 201 uses the sequence set (1, 2), the UE2 221 may notify of the successful reception of the PD2DSCH by transmitting the D2DSS using a sequence 2, which is a large number in the set, after successfully receiving the D2DSS and PD2DSCH. In the above example, the UE1 201 may also use a sequence other than the five sets. The sequence used by the UE1 201 and the sequence set (1, 2) are related in advance so as to correspond to each other.

When the D2DSS includes PD2DSS and SD2DSS, the UE1 201 may notify of whether the PD2DSCH has been successfully received, by selecting a combination of sequences of the PD2DSS and SD2DSS. That is, when the UE1 201 transmits the PD2DSS, SD2DSS, and PD2DSCH, the UE2 221 receives the PD2DSS and SD2DSS and performs a monitoring operation in order to receive the PD2DSCH corresponding thereto. A combination of the sequence of the PD2DSS and SD2DSS transmitted by the UE1 201 with the sequence to be used by the UE2 221 for the transmission of the PD2DSS and SD2DSS may be divided into a combination of sequences including information indicating that the reception of the PD2DSCH has failed and a combination of sequences including information indicating that the reception of the PD2DSCH has succeed. Thus, when the PD2DSS and SD2DSS are received and the PD2DSCH corresponding thereto has been successfully received, the UE2 221 may select a combination of sequences including information indicating the reception success and transmit the PD2DSS and SD2DSS, and when the PD2DSS has not been successfully received, UE2 221 may select a combination of sequences including information indicating the reception failure and transmit the PD2DSS and SD2DSS. At this time, the PD2DSS and SD2DSS may be transmitted using the same sequence or may be transmitted using different sequences.

For example, when there are a total of 12 sequences from 1 to 12, three sequence sets, which are groups of four sequences in order, may be configured as follows.

A sequence set: (1, 2, 3, 4), (5, 6, 7, 8), and (9, 10, 11, 12)

Two small numbers of four sequences in the sequence set may indicate a reception failure for the PD2DSCH, and two large numbers may indicate a successful reception for the PD2DSCH.

The UE1 201 may transmit the PD2DSS and SD2DSS using a sequence belonging to one of the three sets. After receiving the PD2DSS, SD2DSS, and PD2DSCH, the UE2 221 may transmit the PD2DSS and SD2DSS using a sequence within the same sequence set as the sequence set used by the UE1 201 for the transmission of the PD2DSS and D2DSS. For example, when the UE1 201 uses the sequence set (1, 2, 3, 4), the UE2 221 may notify of the successful reception of the PD2DSCH by transmitting the PD2DSS and SD2DSS using sequence numbers 3 and 4, which are large numbers in the set, after successfully receiving the PD2DSS, SD2DSS, and PD2DSCH.

Next, a description will be given for a method of using resources for transmitting the D2DSS.

Referring to FIGS. 2 and 3, resources used when the UE2 221 transmits the D2DSS, in response to the D2DSS 301, 302, 303, and 304 transmitted by the UE1 201, may be divided into two groups. That is, in FIG. 3, one group includes information indicating that the UE2 221 may not receive the PD2DSCH when the UE2 221 transmits the D2DSS through the resources 311, 312, 313, and 314, and the other group includes information indicating that the UE2 221 has successfully received the PD2DSCH when the UE2 221 transmits the D2DSS through the resources 321, 322, 323, and 324. The resources divided into two groups may be allocated for the periodic transmission of D2DSS for a predetermined time.

When the D2DSS includes the PD2DSS and SD2DSS, the UE2 221 may notify of whether the PD2DSCH has been successfully received, by selecting resources of the PD2DSS and SD2DSS. That is, when the UE1 201 transmits the PD2DSS, SD2DSS, and PD2DSCH, the UE2 221 receives the PD2DSS and SD2DSS and performs a monitoring operation in order to receive the PD2DSCH corresponding thereto. Referring to FIG. 4, resources used when the PD2DSS and SD2DSS are transmitted by the UE2 221, in response to PD2DSS 401, 402, and 403 and SD2DSS 411, 412, and 413 transmitted by the UE1 201, may be divided into two groups. That is, in FIG. 4, one group includes information indicating that the UE2 221 may not receive the PD2DSCH when the UE2 221 transmits the PD2DSS through resources 421, 422, and 423, and the other group includes information indicating that the UE2 221 has successfully received the PD2DSCH when the UE2 221 transmits the PD2DSS through resources 441, 442, and 443, and transmits the SD2DSS through resources 451, 452, and 453. The resources divided into two groups may be allocated for the periodic transmission of D2DSS for a predetermined time.

In addition, another method for notifying of whether the PD2DSCH has been successfully received, by using resources, may include a method for notifying of the same through a relative positional relationship between resources of the PD2DSS and SD2DSS. For example, when the UE2, which has received the PD2DSS and SD2DSS from the UE1 201, may not receive the PD2DSCH, the UE2 may notify that the PD2DSCH has not been successfully received by itself, by transmitting the SD2DSS by using a resource which is separated by a distance K1 from a resource by which the PD2DSS is transmitted. In addition, when the UE2, which has received the PD2DSS and SD2DSS from the UE1 201, has successfully received the PD2DSCH, the UE2 may notify that the PD2DSCH has been successfully received by itself, by transmitting the SD2DSS by using a resource which is separated by a distance K2 (k1 # K2) from a resource by which the PD2DSS is transmitted.

Step 3: Making a Report to a Base Station on Whether the Transmission UE has Successfully Transmitted the D2DSS and PD2DSCH As described in step 1 and step 2, the UE1 may transmit the D2DSS and PD2DSCH and receive the signal indicating whether the D2DSS and PD2DSCH have been successfully received, and then determine whether the D2DSS and PD2DSCH transmitted by UE1 itself have been successfully transmitted, on the basis of the signal received from the UE2, and report a result of the determination to the base station. The base station may execute a command for increasing or decreasing the transmission power of the UE1 according to a report on whether the UE1 has successfully transmitted the D2DSS and PD2DSCH. The report on whether the UE1 has successfully transmitted the D2DSS and PD2DSCH and the transmission power control for the D2DSS and PD2DSCH according to the command by the base station may be simultaneously performed by the D2DSS and PD2DSCH or may be performed separately according to whether each of the D2DSS and PD2DSCH have been successfully transmitted. In the following description, for convenience, a case will be described where the report on whether the D2DSS and PD2DSCH have been successfully transmitted and the transmission power control according to the command by the base station are simultaneously performed.

A method for reporting, by the UE1, whether the D2DSS and PD2DSCH have been successfully transmitted, to the base station, is as follows.

When the UE1 is in an RRC CONNECTED state, that is, the UE1 is in a state of monitoring a control channel, transmitting and receiving data to and from the base station through a data channel, and reporting various measurement results by the base station and a neighboring base station in order to help scheduling of the base station, the UE1 may report, to the base station, on whether the D2DSS and PD2DSCH have been successfully transmitted, using N bit Uplink Control Information (UCI). In this case, the UCI may be transmitted using a Physical Uplink Control Channel (PUCCH) or a Physical Uplink Shared Channel (PUSCH). When a plurality of resources, by which the PUCCH or the PUSCH may be transmitted, are allocated, the PUCCH or PUSCH may be transmitted by selecting one of the resources so that the UE1 may indirectly report, to the base station, on whether the D2DSS and PD2DSCH have been successfully transmitted. Alternatively, the UE1 may load, on an N bit Media Access Control (MAC) Payload, information on whether the D2DSS and PD2DSCH have been successfully transmitted, and then report the same to the base station by using the PUSCH.

When the UE1 is in an RRC IDLE state, that is, the UE1 is in the state of selecting a base station (or cell), monitoring a paging channel, and acquiring system information (SI), but the UE1 is not in the state of transmitting and receiving data to and from the base station, the base station may switch the UE1 to the RRC CONNECTED state, and then the UE1 may report, to the base station, on whether the D2DSS and PD2DSCH have been successfully transmitted, through the method described above.

Furthermore, the UE1 may notify the base station of whether the D2DSS and PD2DSCH have been successfully transmitted, by performing a random access procedure. For example, when selecting a sequence for transmitting a random access preamble, the UE1 may select a predefined sequence so as to report, to the base station, on whether the D2DSS and PD2DSCH have been successfully transmitted. In addition, the UE1 may transmit the random access preamble and receive a random access response from the base station, and then may include, in a message to be transmitted to the base station by using the PUSCH, information on whether the D2DSS and PD2DSCH have been successfully transmitted, and transmit the same.

The base station which has received, from the UE1, the report on whether the D2DSS and PD2DSCH have been successfully transmitted may command the UE1 to adjust the transmission power of the D2DSS and PD2DSCH.

The UE1 transmits the D2DSS (or PD2DSS and SD2DSS) and PD2DSCH. When the UE2 has successfully received the D2DSS but has failed to receive the PD2DSCH, the UE1 notifies of PD2DSCH reception failure to the UE1, according to the method mentioned above. Then, the UE1 reports to the base station the fact that the UE2 has received the D2DSS but has failed to receive the PD2DSCH, and the base station commands the UE1 to increase the transmission power of the PD2DSCH. In this case, the UE1 may also increase the transmission power of D2DSS. The UE1 increases the transmission power of the D2DSS and PD2DSCH according to a command from the base station and transmits the same.

When the base station commands the UE1 to increase the transmission power of the D2DSS and PD2DSCH, and if the UE1 is in the RRC CONNECTED state, the base station may transmit the command for increasing the transmission power of the D2DSS and PD2DSCH by including the same in the Physical Downlink Control Channel (PDCCH). For example, the base station may command the UE1 to increase the D2DSS and PD2DSCH transmission power by using the N bit information field of Downlink Control Information (DCI) of the PDCCH, and when receiving the PDCCH including a command for increasing transmission power, the UE1 may increase the transmission power by a predetermined value or increase the transmission power according to a predetermined power control equation.

In addition, when the base station commands the UE1 to increase the transmission power of the D2DSS and PD2DSCH, and if the UE1 is in the RRC CONNECTED state, the base station may transmit a Medium Access Control (MAC) message for increasing the transmission power of the D2DSS and PD2DSCH using the Physical Downlink Control Channel (PDCCH). Specifically, the base station may command the UE1 to increase the D2DSS and PD2DSCH transmission power by using the N bit MAC Payload, and when receiving the PDCCH including a command for increasing the transmission power, the UE1 may increase the transmission power by a predetermined value or increase the transmission power according to a predetermined power control equation.

When the UE1 is in the RRC IDLE state, the base station may switch the UE1 to the RRC CONNECTED state, and command the UE1 to increase the transmission power of the D2DSS and PD2DSCH through the above-described method. In addition, the base station may command the UE1 to increase the PD2DSCH transmission power by transmitting the N bit through a paging channel, and when receiving a paging channel including an N bit indicating a command for increasing transmission power, the UE1 may increase the transmission power by a predetermined value or increase the transmission power according to a predetermined power control equation.

Although the UE1 has transmitted the D2DSS and PD2DSCH using the maximum power according to the transmission power increasing command, when the UE1 has not successfully transmitted the D2DSS and PD2DSCH (that is, UE1 has not received, from the UE2, a report on the reception success for the D2DSS and PD2DSCH, or received a report on the reception failure thereof), the UE1 may transmit a transmission failure report to the base station, and the base station may command other UEs to transmit the D2DSS and PD2DSCH. In this case, the base station may select a UE(s) to which the command for transmitting the D2DSS and PD2DSCH is to be executed, where the UE(s) is UE(s) located closer to the UE 2 than the UE1. In addition, the base station may command the UE1 to stop the transmission of the D2DSS and PD2DSCH.

In addition, although the UE1 has transmitted the D2DSS (or PD2DSS and SD2DSS) and PD2DSCH a predetermined maximum transmission number of times, and if the report of reception success for the D2DSS and PD2DSCH is not received from the UE2, the UE1 may report to the base station that the PD2DSCH transmission has failed. Then, the base station may command other UE(s) other than the UE1 to transmit the D2DSS and PD2DSCH. In this case, the base station may select a UE(s) to which the command for transmitting the D2DSS and PD2DSCH is to be executed, where the UE(s) is UE(s) located closer to the UE 2 than the UE1. In addition, the base station may command the UE1 to stop the transmission of the D2DSS and PD2DSCH. At this time, 'one', which is the number of transmission times for the D2DSS and PD2DSCH may be defined such that the UE1 transmits the corresponding synchronization signal by N number of times. Alternatively, the transmission number of times of 'one' may be defined such that the UE1 transmits the D2DSS and PD2DSCH for T seconds by using available D2DSS and PD2DSCH resources.

On the other hand, when the transmission success report has been received from the UE1, the base station may command the UE2, which has received the D2DSS and PD2DSCH of the UE1, to stop the transmission of the D2DSS and PD2DSCH.

Figure 5:
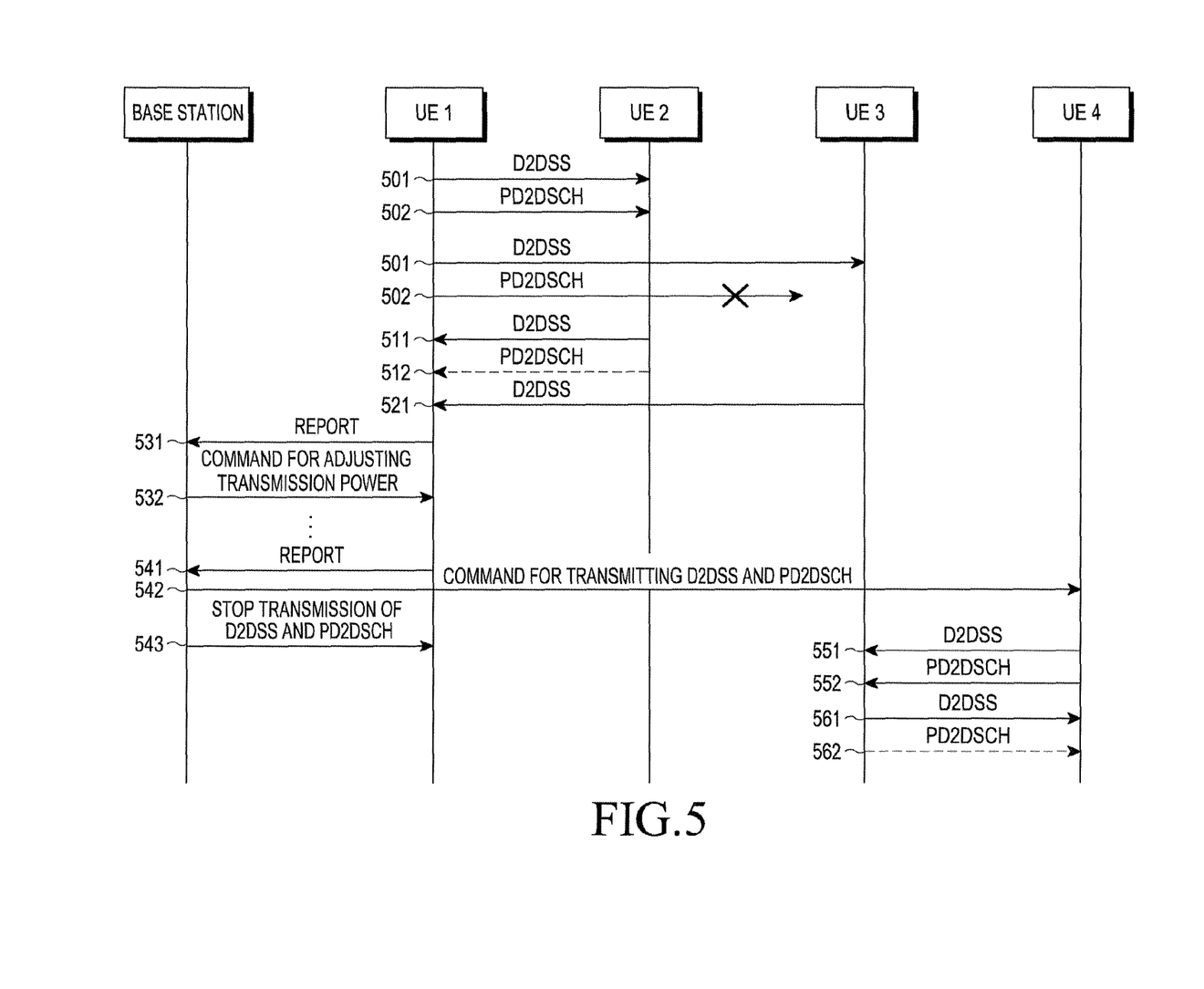
FIG. 5 is a diagram illustrating a procedure for reporting, to a base station, whether a transmission UE has successfully transmitted a D2DSS and a PD2DSCH according to an embodiment of the present invention.

FIG. 5 is a diagram illustrating a procedure for reporting, to a base station, on whether a transmission UE has successfully transmitted the D2DSS and PD2DSCH according to an embodiment of the present invention.

Referring to FIG. 5, the UE1 transmits the D2DSS and PD2DSCH (indicated by reference numerals 501 and 502). The UE2 receives both the D2DSS and PD2DSCH transmitted by the UE1, and transmits the D2DSS (and PD2DSCH) to the UE1 according to the method described in steps 1 and 2 (indicated by reference numerals 511 and 512). Since a UE3 has received the D2DSS but has not received the PD2DSCH, the D2DSS only is transmitted by the UE3 (indicated by reference numeral 521).

The UE1, which has received the D2DSS (and PD2DSCH) from the UE2, determines that the PD2DSCH transmitted by the UE1 itself is successfully transmitted, and report the same to the base station (indicated by reference numeral 513). In addition, the UE1, which has received the D2DSS from the UE3, determines that the PD2DSCH transmitted by the UE1 itself was not successfully transmitted, and reports the same to the base station (indicated by reference numeral 513). Then, the base station transmits, to the UE1, a command for increasing or decreasing the transmission power for the (D2DSS and) PD2DSCH according to the report by the UE1 (indicated by reference numeral 532), and accordingly, the UE1 increases or decreases the transmission power for the (D2DSS and) PD2DSCH.

On the other hand, although the PD2DSCH is transmitted the maximum transmission number of times or transmitted using the maximum transmission power but the transmission of the PD2DSCH has failed, the UE1 reports the same to the base station (indicated by reference numeral 541), and the base station commands a UE4 to transmit the D2DSS and PD2DSCH (indicated by reference numeral 542). At this time, the base station may command the UE1 to stop the transmission of the D2DSS and PD2DSCH (indicated by reference numeral 543). The UE 4, which has received the transmission command, transmits the D2DSS and PD2DSCH (indicated by reference numeral 551 and 552), and the UE3, which has received the same, transmits the D2DSS (and PD2DSCH) to the UE 4 according to the method described in steps 1 and 2 (indicated by reference numerals 561 and 562).

Step 4: Controlling the Transmission Power of the D2DSS and PD2DSCH Depending on Whether the Transmission UE has Successfully Transmitted the D2DSS and PD2DSCH In step 3, an example has been described where the base station commands the UE1 to adjust the transmission power of PD2DSCH depending on whether D2DSS and PD2DSCH have been successfully transmitted, however, the UE1 may determine whether the D2DSS and PD2DSCH have been successfully transmitted depending on whether the D2DSS and PD2DSCH have been received by the UE2, and adjust the transmission power of the D2DSS and PD2DSCH based on the result thereof. The transmission power control for the D2DSS and PD2DSCH according to the determination of the UE1 itself may be applied equally to both the D2DSS and the PD2DSCH, and may be applied separately according to whether each of the D2DSS and the PD2DSCH has been successfully transmitted.

That is, when the UE1 has transmitted the D2DSS (or PD2DSS and SD2DSS) and PD2DSCH, and then the UE2, which has received the D2DSS of the UE1, has not received the PD2DSCH, the UE2 may notify of a PD2DSCH reception failure to the UE1 according to the method mentioned above. The UE1 increases the transmission power of the D2DSS and PD2DSCH and then retransmits the same. The transmission power of the D2DSS and PD2DSCH may be determined in Equation 1 as follows.

(Transmission power of PD2DSCH)=Min{(Maximum transmission power of PD2DSH),(Initial transmission power of PD2DSCH)+(Transmission number of times−1)*(Amount of increased transmission power of PD2DSCH)}

(Transmission power of D2DSS)=Min{(Maximum transmission power of D2DSS),(Initial transmission power of D2DSS)+(Transmission number of times−1)*(Amount of increased transmission power of D2DSS)}     [Equation 1]

In addition, when the UE1 has transmitted the D2DSS (or PD2DSS and SD2DSS) and then the UE2, which has received the D2DSS of the UE1, has not received the D2DSS, the UE2 notify of a D2DSS reception failure to the UE1 according to the method mentioned above. Then, the UE1 increases the transmission power of the D2DSS according to the equation (1) and retransmit the same.

When the UE1 has transmitted the D2DSS and PD2DSCH using the maximum transmission power, but has failed to transmit the PD2DSCH, or when the UE1 has transmitted the D2DSS and PD2DSCH the maximum transmission number of times, but has failed to transmit the PD2DSCH, the UE1 may report a PD2DSCH transmission failure to the base station as described above.

In addition, when the UE1 has transmitted the D2DSS (or PD2DSS and SD2DSS) and PD2DSCH and then the UE2, which has received the D2DSS of the UE1, has also received the PD2DSCH, the UE2 may notify of a PD2DSCH reception success to the UE1 according to the method mentioned above. Then, the UE1 decreases the transmission power of the D2DSS and PD2DSCH and then retransmits the same. The transmission power of the D2DSS and PD2DSCH may be determined in Equation 2 as follows.

(Transmission power of PD2DSCH)=Max{(Minimum transmission power of PD2DSH),(Initial transmission power of PD2DSCH)−(Transmission number of times−1)*(Amount of decreased transmission power of PD2DSCH)}

(Transmission power of D2DSS)=Max{(Minimum transmission power of D2DSS),(Initial transmission power of D2DSS)−(Transmission number of times−1)*(Amount of decreased transmission power of D2DSS)}     [Equation 2]

In addition, when the UE1 has transmitted the D2DSS (or PD2DSS and SD2DSS) and then the UE2, which has received the D2DSS of the UE1, has successfully received the D2DSS, the UE2 may notify of a D2DSS reception success to the UE1 according to the method mentioned above. Then, the UE1 decreases the transmission power of the D2DSS according to the equation (1) and retransmits the same.

When an initial transmission power is set to low, the equation (1) may be used, and when the initial transmission power is set to high, the equation (2) maybe used. The UE1 may determine an optimal transmission power of the D2DSS and PD2DSCH through the method as described above.

Figure 6:
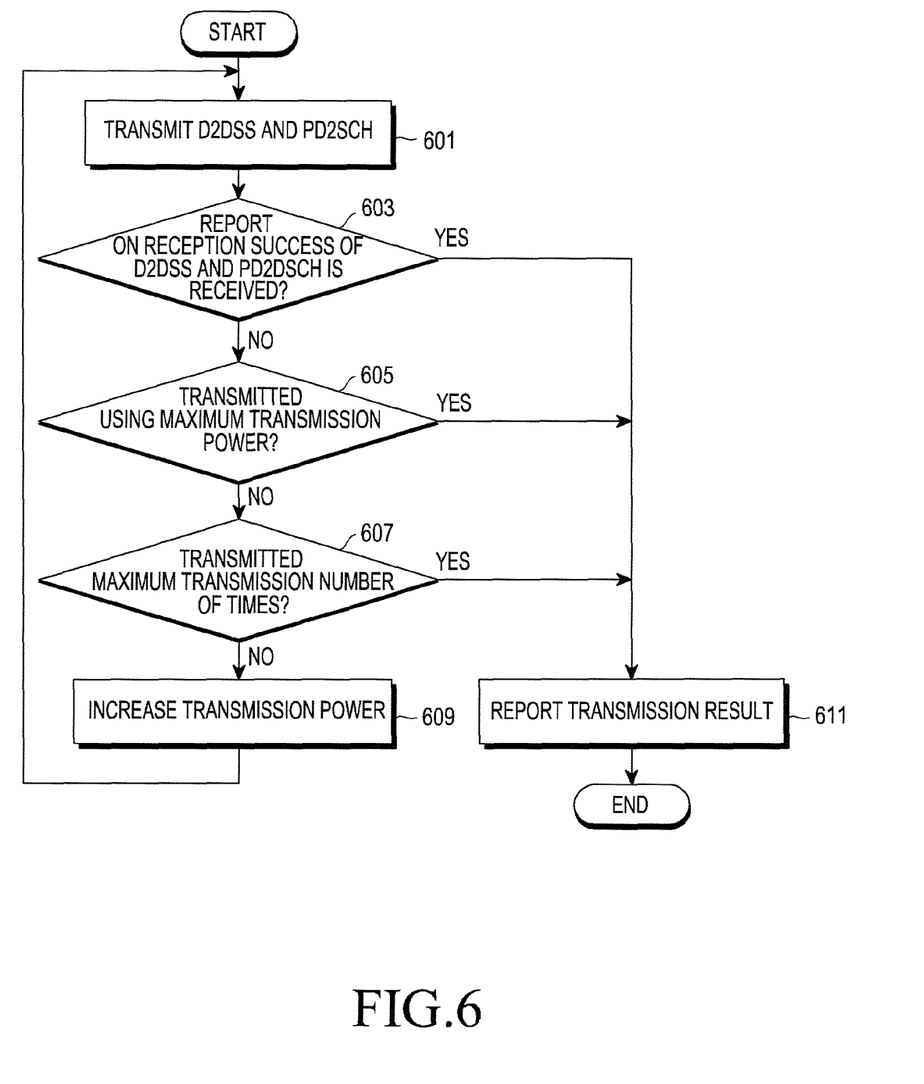
FIG. 6 is a diagram illustrating a process for adjusting the transmission power of a D2DSS and PD2DSCH depending on whether a transmission UE has successfully transmitted the D2DSS and PD2DSCH according to an embodiment of the present invention.

FIG. 6 is a diagram illustrating a process for adjusting the transmission power of the D2DSS and PD2DSCH depending on whether a transmission UE has successfully transmitted the D2DSS and PD2DSCH according to an embodiment of the present invention.

Referring to FIG. 6, the UE transmits the D2DSS and PD2DSCH (indicated by reference numeral 601), and checks whether the report on the reception success of the D2DSS and PD2DSCH has been received (indicated by reference numeral 603). When the report on the reception success for the D2DSS and PD2DSCH is not received from another UE, the UE checks whether the D2DSS and PD2DSCH have been transmitted using the maximum transmission power (indicated by reference numeral 605), and if they have not been transmitted using the maximum transmission power, the UE checks whether the D2DSS and PD2DSCH have been transmitted the maximum transmission number of times (indicated by reference numeral 607).

When the D2DSS and PD2DSCH are not transmitted the maximum transmission number of times, the UE increases the transmission power of the D2DSS and PD2DSCH according to equation (1) (indicated by reference numeral 609) and retransmits the D2DSS and PD2DSCH (601). On the other hand, when the reception success report on the D2DSS and PD2DSCH has been received from the other UE, when the D2DSS and PD2DSCH have been transmitted using the maximum transmission power, and when the D2DSS and PD2DSCH have been transmitted the maximum transmission number of times, the UE reports a transmission result of the D2DSS and PD2DSCH to the base station (611).

In addition, when the initial transmission power is set to high, the transmission power through transmission UE may gradually reduce a process similar to FIG. 6, upon receipt of the report on the reception success of the D2DSS and PD2DSCH, from another UE.

Step 5: Setting the Transmission Power of the D2DSS by the Reception UE According to Transmission Power Information Included in the PD2DSCH As previously described, the PD2DSCH may include transmission power information of the D2DSS (or PD2DSS and SD2DSS) and transmission power information of the PD2DSCH. Thus, the UE2, which has successfully received the D2DSS and PD2DSCH transmitted by the UE1, may acquire the transmission power information of the D2DSS and PD2DSCH from the PD2DSCH. In addition, the UE2, which has successfully received the D2DSS and PD2DSCH transmitted by the UE1, may estimate a path loss value between the UE1 and the UE2 based on the signal quality of the received D2DSS and PD2DSCH. Furthermore, the UE2 may use the estimated path loss value for the D2DSS and PD2DSCH transmission. That is, the UE2 sets the D2DSS transmission power and transmits the D2DSS by using the set transmission power in consideration of the estimated path loss value and a required Signal-to-Noise Ratio (SNR) required for the reception of the D2DSS. Similarly, the UE2 sets the transmission power of PD2DSCH and transmits the PD2DSCH by using the set transmission power in consideration of the estimated path loss value and the required SNR required for the reception of the PD2DSCH.

Step 6: Stopping the Transmission of the D2DSS or PD2DSCH by the Transmission UE As described above, when the UE1 has transmitted the D2DSS and PD2DSCH and has received a report from the UE2 that the PD2DSCH was successfully received, the UE1 may stop the transmission of PD2DSCH. At this time, the D2DSS transmission may also be stopped.

Figure 7:
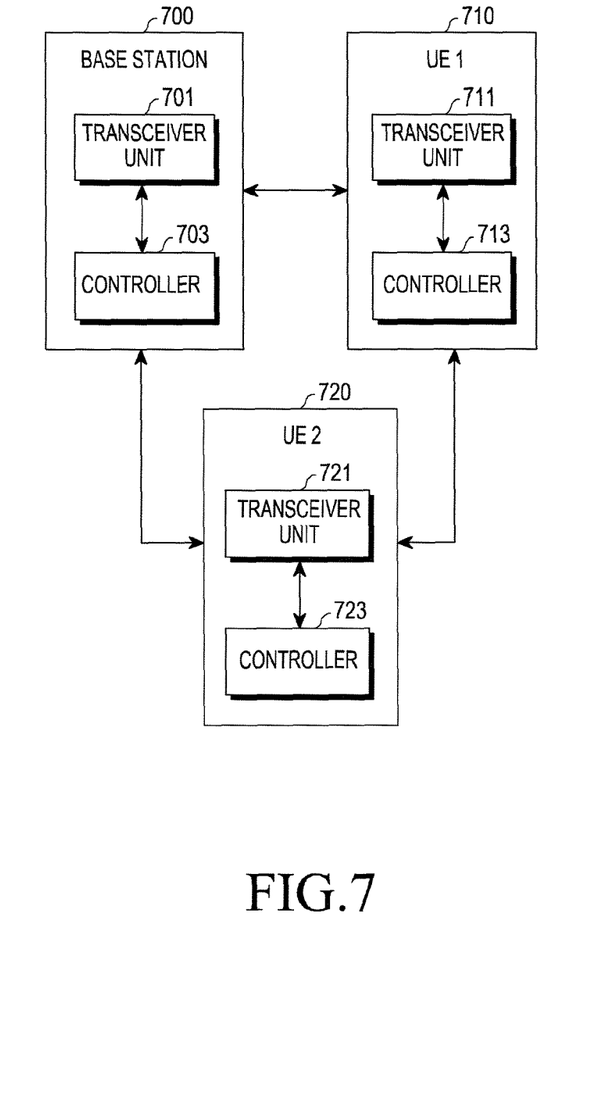
FIG. 7 is a simplified diagram showing a device configuration of a base station and UE according to an embodiment of the present invention.

FIG. 7 is a simplified diagram showing a device configuration of a base station and UE according to an embodiment of the present invention.

Referring to FIG. 7, a base station 700 includes a transceiver unit 701 and a controller 703. The transceiver unit 701 may transmit and receive a signal to and from a UE, receive, from the UE, a report on whether the D2DSS and PD2DSCH are successfully transmitted, and transmit, to the UE, a command for adjusting the transmission power of the D2DSS and PD2DSCH according to an embodiment of the present invention. The controller 703 may control an overall operation of the transceiver unit 701. The UE1 710 may also include a transceiver unit 711 and a controller 713. The transceiver unit 711 may transmit and receive a signal to and from the base station 700 or a UE2 720, transmit and receive the D2DSS and PD2DSCH, and transmit, to the base station, a report on whether the D2DSS and PD2DSCH have been successfully transmitted according to an embodiment of the present invention. The transceiver unit 711 may also receive a command for adjusting the transmission power of the D2DSS and PD2DSCH from the base station. The controller 713 may control an overall operation of the transceiver unit 711. In addition, the controller 713 may set and adjust the transmission power of the D2DSS and PD2DSCH as described in a transceiver steps 4 and 5. Similarly, the UE1 720 may also include a transceiver unit 721 and a controller 723. The transceiver unit 721 may transmit and receive a signal to and from the base station 700 or the UE1 710, transmit and receive the D2DSS and PD2DSCH, and transmit, to the UE, a report on whether the D2DSS and PD2DSCH have been successfully transmitted according to an embodiment of the present invention. In addition, the transceiver unit 721 may also receive a command for adjusting the transmission power of the D2DSS and PD2DSCH from the base station. The controller 723 may control an overall operation of the transceiver unit 721. In addition, the controller 713 may set and adjust the transmission power of the D2DSS and PD2DSCH as described in steps 4 and 5.

It should be noted that there is no intent to limit the scope of the present disclosure by the figures illustrated in drawings. That is, all configurations or steps of the operations illustrated in FIGS. 1 to 7 should not be interpreted as essentially structural elements for carrying out the present invention, and variations and modifications of the present disclosure may be implemented without departing from the scope of the present invention.

The above described operations of the base station or UE may be implemented by providing a memory device storing corresponding program codes in any constituent unit of the base station or UE apparatus. That is, the controller of the base station or UE may perform the above described operations by reading and executing the program code stored in the memory device by means of a processor or a central processing unit (CPU).

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

What is claimed is:

1. A method for transmitting a synchronization signal for Device-to-Device (D2D) communication, the method comprising:
   receiving, by a first UE, a first D2D synchronization signal (D2DSS) and a first physical D2D synchronization channel (PD2DSCH) corresponding to the first D2DSS from a second UE,
   acquiring, by the first UE, transmission power information of the first D2DSS and transmission power information of the first PD2DSCH from the received first PD2DSCH, and estimating a path loss value between the second UE and the first UE based on the received first PD2DSCH;
   setting, by the first UE, a transmission power of a second D2DSS transmitted to the second UE, based on the acquired transmission power information and the estimated path loss value; and
   transmitting the second D2DSS to the second UE so as to indicate that the first UE has successfully received the first D2DSS or the first PD2DSCH.

2. The method of claim 1, wherein transmitting the second D2DSS to the second UE comprises:

transmitting, by the first UE, both the second D2DSS and a second PD2DSCH to the second UE so as to indicate that the first UE has successfully received both the first D2DSS and the first PD2DSCH.

3. The method of claim 1, wherein transmitting the second D2DSS to the second UE comprises:
   transmitting, by the first UE, the second D2DSS to the second UE, using a pre-arranged sequence or resource so as to indicate that the first UE has successfully received the first D2DSS or the first PD2DSCH.

4. A method for transmitting a synchronization signal for device-to-device (D2D) communication, the method comprising:
   transmitting, by a first UE, a first D2D synchronization signal (D2DSS) and a first physical D2D synchronization channel (PD2DSCH) corresponding to the first D2DSS to a second UE;
   determining, by the first UE, whether the first D2DSS and first PD2DSCH have been successfully transmitted depending on whether a second D2DSS is received from the second UE;
   transmitting, by the first UE, a result of the determination to a base station; and
   adjusting, by the first UE, a transmission power of the first D2DSS and the first PD2DSCH,
   wherein the transmission power is adjusted based on a predetermined rule or a command from the base station.

5. The method of claim 4, wherein the first UE transmits the result of the determination to the base station, by using Uplink Control Information (UCI) or a predetermined bit of a Medium Access Control (MAC) payload.

6. The method of claim 4, wherein the first UE transmits, when a random access procedure is performed, the determination result to the base station.

7. The method of claim 4, further comprising:
   when it is determined that the first D2DSS and the first PD2DSCH have been successfully transmitted, stopping, by the first UE, a transmission of the first PD2DSCH and the first D2DSS.

8. The method of claim 4, wherein the predetermined rule is set based on at least one of a maximum transmission power of the first D2DSS or the first PD2DSCH, a minimum transmission power of the first D2DSS or the first PD2DSCH, an initial transmission power of the first D2DSS or the first PD2DSCH, and a number of the transmission of the first D2DSS or the first PD2DSCH.

9. An apparatus for transmitting a synchronization signal for device-to-device (D2D) communication, the apparatus comprising:
   a transceiver configured to:
      transmit, to another UE, a first D2D synchronization signal (D2DSS) and a first physical D2D synchronization channel (PD2DSCH) corresponding to the first D2DSS; and
   a processor configured to:
      determine whether the first D2DSS and the first PD2DSCH have been successfully transmitted depending on whether a second D2DSS is received from the another UE and control an operation of the transceiver unit;
      adjust a transmission power of the first D2DSS and the first PD2DSCH; and
   wherein the transceiver further configured to transmit a result of the determination to a base station, and wherein the transmission power is adjusted based on a predetermined rule or a command from the base station.

10. An apparatus for transmitting a synchronization signal for device-to-device (D2D) communication, the apparatus comprising:
a transceiver configured to:
receive, from another UE, a first D2D synchronization signal (D2DSS) and a first physical D2D synchronization channel (PD2DSCH) corresponding to the first D2DSS; and
transmit a D2DSS to the another UE so as to indicate that the first D2DSS or the first PD2DSCH has been successfully received; and
a processor configured to:
control an operation of the transceiver;
acquire, from the received first PD2DSCH, transmission power information of the first D2DSS and transmission power information of the first PD2DSCH;
estimate a path loss value between the another UE based on the received first PD2DSCH; and
set the transmission power of a second D2DSS which is transmitted to the another UE based on the acquired transmission power information and the estimated path loss value.

11. The apparatus of claim 10, wherein the transceiver transmits both the second D2DSS and a second PD2DSCH to the other UE so as to indicate that both the first D2DSS and the first PD2DSCH have been successfully received.

12. The apparatus of claim 10, wherein the transceiver transmits the second D2DSS to the other UE, using a pre-arranged sequence or resource so as to indicate that the apparatus has successfully received the first D2DSS or the first PD2DSCH.

13. The apparatus of claim 9, wherein the predetermined rule is set based on at least one of a maximum transmission power of the first D2DSS or the first PD2DSCH, a minimum transmission power of the first D2DSS or the first PD2DSCH, an initial transmission power of the first D2DSS or the first PD2DSCH, and a number of the transmission of the first D2DSS or the first PD2DSCH.

14. The apparatus of claim 13, wherein the transceiver transmits a result of determination to the base station, by using Uplink Control Information (UCI) or a predetermined bit of a Medium Access Control (MAC) payload.

15. The apparatus of claim 9, wherein, when a random access procedure is performed, the transceiver transmits a result of determination to the base station.

16. The apparatus of claim 9, wherein, when it is determined that the first D2DSS and the first PD2DSCH have been successfully transmitted, the processor is configured to control the transceiver to stop a transmission of the first PD2DSCH and the first D2DSS.

* * * * *